(12) United States Patent
Peng (10) Patent No.: US 8,014,136 B2
(45) Date of Patent: Sep. 6, 2011

(54) MODULAR COMPUTER SYSTEM

(75) Inventor: Robin Peng, South Jordan, UT (US)

(73) Assignee: Jupiter IP, LLC, Sandy, UT (US)

( * ) Notice: Subject to any disclaimer, the term of this patent is extended or adjusted under 35 U.S.C. 154(b) by 800 days.

(21) Appl. No.: 12/111,015

(22) Filed: Apr. 28, 2008

(65) Prior Publication Data

US 2008/0266776 A1  Oct. 30, 2008

Related U.S. Application Data

(60) Provisional application No. 60/914,292, filed on Apr. 26, 2007.

(51) Int. Cl.
*G06F 1/16* (2006.01)
*H01H 9/02* (2006.01)

(52) U.S. Cl. ............ 361/679.02; 174/50; 174/53

(58) Field of Classification Search .......... None
See application file for complete search history.

(56) References Cited

U.S. PATENT DOCUMENTS

| | | | |
|---|---|---|---|
| 6,126,463 A | 10/2000 | Okazaki et al. | |
| 6,226,600 B1 * | 5/2001 | Rodenberg et al. | 702/61 |
| 6,249,223 B1 | 6/2001 | Christensen | |
| 6,418,027 B1 | 7/2002 | Suzuki et al. | |
| 6,514,652 B2 * | 2/2003 | Cash, Jr. | 439/106 |
| 6,518,724 B2 * | 2/2003 | Janik | 320/115 |
| 6,993,289 B2 * | 1/2006 | Janik | 455/41.2 |
| 6,993,417 B2 * | 1/2006 | Osann, Jr. | 700/291 |
| 7,076,592 B1 | 7/2006 | Ykema | |
| 7,097,472 B2 | 8/2006 | Parker | |
| 7,167,078 B2 * | 1/2007 | Pourchot | 340/5.61 |
| 7,224,581 B2 | 5/2007 | Garnett et al. | |
| 7,253,732 B2 * | 8/2007 | Osann, Jr. | 340/541 |
| 7,356,666 B2 | 4/2008 | Kanai et al. | |
| 7,878,845 B2 * | 2/2011 | Byrne | 439/535 |

\* cited by examiner

*Primary Examiner* — Boris L Chervinsky
(74) *Attorney, Agent, or Firm* — Geoffrey E. Dobbin (57) ABSTRACT

One embodiment of the present invention relates to a modular computer system for use in residential, recreational, and commercial regions. The system is a computer system disposed within an existing outlet receptacle housing. The receptacle includes a conventional NEMA standard OS1 and OS2 type electrical housing and electrical line designed to accommodate a residential or commercial light switch, electrical outlet, etc. The computer system is electrically coupled to the electrical line disposed within the housing of the receptacle and includes a mechanically extendable expansion bus configured to mechanically support and data inter-couple a set of modules for providing computer functionality. The expansion bus can be extended to access the modules or collapsed within the receptacle so as to be externally visually obscured by an interface module or cover. The computer system is configured to dynamically detect and data couple with other modular computer systems in a particular region.

12 Claims, 6 Drawing Sheets

MODULAR COMPUTER SYSTEM

CROSS-REFERENCES TO RELATED APPLICATIONS

The present Application claims priority on prior filed U.S. Provisional Application No. 60/914,292, filed Thursday, Apr. 26, 2007 and herein incorporates the same by reference in its entirety.

FIELD OF THE INVENTION

The invention generally relates to computer networking and computer architecture. In particular, the present invention relates to a modular computer system residing within a wall mounted receptacle box.

BACKGROUND OF THE INVENTION

Computer communication has increased the effectiveness and functions computers are able to perform. Originally, computers were isolated devices capable of performing mathematical computations quicker than a human being. Computers were then developed to enable more complex communication with users so as to facilitate complex tasks performed as a result of simple instructions. This computer to user communication is commonly referred to as the human-machine interface (HMI), user interface (UI), and/or graphical user interface (GUI). Networking architecture technology was later developed that enabled computers to communicate and share resources with one another. Resources refer to hardware, software, interface, input and output functionalities that are offered by independent computer systems. Further, the Internet is a large dynamic computer network that enables computer-to-computer communication over large distances.

The networking of computers enables the sharing of resources in a manner that increases computerized task performance efficiency. For example, a local computer may be used to communicate with a remote computer coupled to a large database for purposes of accessing information stored on the database. It would be inefficient for the local computer to locally store the entire database and therefore the networking architecture enables an effective utilization of resources. However, this type of resource sharing is commonly limited to direct user requests or static type transfers. Dynamic resource sharing is based on the concept of automatic computer resource sharing. For example, a computer may automatically detect and receive data about a new available resource. Dynamic resource sharing eliminates the need for a user to perform tasks related to searching, calibrating, installing, etc.

Various existing computer systems utilize dynamic resource sharing, such as the Microsoft Windows PLUG AND PLAY installation concept and various other automatic software update methods. However, these systems are generally limited to conventional computer architectures such as desktop computers, mobile computers, PDAs, phones, etc.

Residential and commercial buildings often include numerous computerized devices for entertainment, climate, security, etc. For example, modern thermostats include complex functionalities that enable users to minimize utility bills by adjusting the thermostat to accommodate for unoccupied times of the day. Likewise, security systems often include internal motion sensors that are configured to trigger an alarm if a password is not entered. Ideally, the thermostat would utilize the motion sensors of the security system to determine occupancy and automatically adjust the heating/cooling systems accordingly. Unfortunately, most conventional systems fail to share these types of resources among devices, resulting in less than optimal efficiency. Various all-in-one systems attempt to solve this problem but often fail to provide the basic reliable functionality of the conventional independent devices. These systems also often include cumbersome interfaces that result in under-utilization of available features. Likewise, various software and hardware modules have been developed for conventional personal computing systems to facilitate residential and commercial internal system management. Unfortunately, these systems require users to have access to a personal computer in order to operate these resources.

Therefore, there is a need in the industry for a residential, recreational, and commercial internal computer system that dynamically shares hardware and software resources in a manner to encourage efficient resource utilization.

SUMMARY OF THE INVENTION

The present invention relates to computer networking and computer architecture. One embodiment of the present invention relates to a modular computer system for use in residential, recreational, and commercial regions. The system includes utilizing an existing outlet receptacle with a computer system disposed within the receptacle. The receptacle includes a conventional NEMA standard OS1 and OS2 type electrical housing and electrical line designed to accommodate a residential or commercial light switch, electrical outlet, dimmer, sensor, etc. The computer system is electrically coupled to the electrical line disposed within the housing of the receptacle. The computer system includes a mechanically extendable expansion bus configured to mechanically support and data inter-couple a set of modular modules for providing computer functionality. The expansion bus can be adjustably extended to access the card members or adjustably collapsed within the receptacle so as to be externally visually obscured by an interface module. The computer system is configured to dynamically detect and data couple with other modular computer systems in a particular region. The data coupling medium includes both wireless and wired data transfer via the electrical line disposed within the receptacle. A second embodiment relates to a method of dynamically sharing computer resources across modular computer systems.

Embodiments of the present invention represent a significant advance in residential and commercial computer systems over the prior art. The modular computer system utilize existing physical outlet receptacles so as to provide computer interfaces at convenient locations originally designed for isolated electrical functionality such as a light switch or power outlet. These existing outlet receptacles are also utilized for purposes of providing electrical power and/or a data coupling medium. In addition, the systems dynamically share resources with one another to minimize the need for duplicate hardware and enable the use of intuitive multi-function user interfaces. The systems are dynamically expandable in a modular manner that does significantly affect the visual impact of the device. Further, the use of modular computing systems consistent with embodiments of the present invention minimizes the overall electrical load and computational resources necessary from independent personal computers.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to computer networking and computer architecture. One embodiment of the present invention relates to a modular computer system for use in residential, recreational, and commercial regions. The system includes utilizing an existing outlet receptacle with a computer system disposed within the receptacle. The receptacle includes a conventional NEMA standard OS1 and OS2 type electrical housing and electrical line designed to accommodate a residential or commercial light switch, electrical outlet, dimmer, sensor, etc. The computer system is electrically coupled to the electrical line disposed within the housing of the receptacle. The computer system includes a mechanically extendable expansion bus configured to mechanically support and data inter-couple a set of modular modules for providing computer functionality. The expansion bus can be adjustably extended to access the card members or adjustably collapsed within the receptacle so as to be externally visually obscured by an interface module. The computer system is configured to dynamically detect and data-couple with other modular computer systems in a particular region. The data coupling medium includes both wireless and wired data transfer via the electrical electrical line disposed within the receptacle. A second embodiment relates to a method of dynamically sharing computer resources across modular computer systems. Also, while embodiments are described in reference to a modular computer system, it will be appreciated that the teachings of the present invention are application to other areas.

The following terms are defined as follows:

Existing receptacle—any existing internal wall receptacle including an internal region and an electrical electrical line.

Electrical line—an electrical cable configured to electrically enable functionality of a receptacle device such as a switch, dimmer, etc. One type of electrical power line is a three-wire grounded residential 60 Hz 120V AC line.

Data inter-couple—provide a data medium across which multiple modules can communicate with one another analogous to an electrical bus.

The following disclosure of the present invention is grouped into two subheadings, namely "Operating Environment" and "Modular Computer System". The utilization of the subheadings is for convenience of the reader only and is not to be construed as limiting in any sense.

Operating Environment

Figure 1:
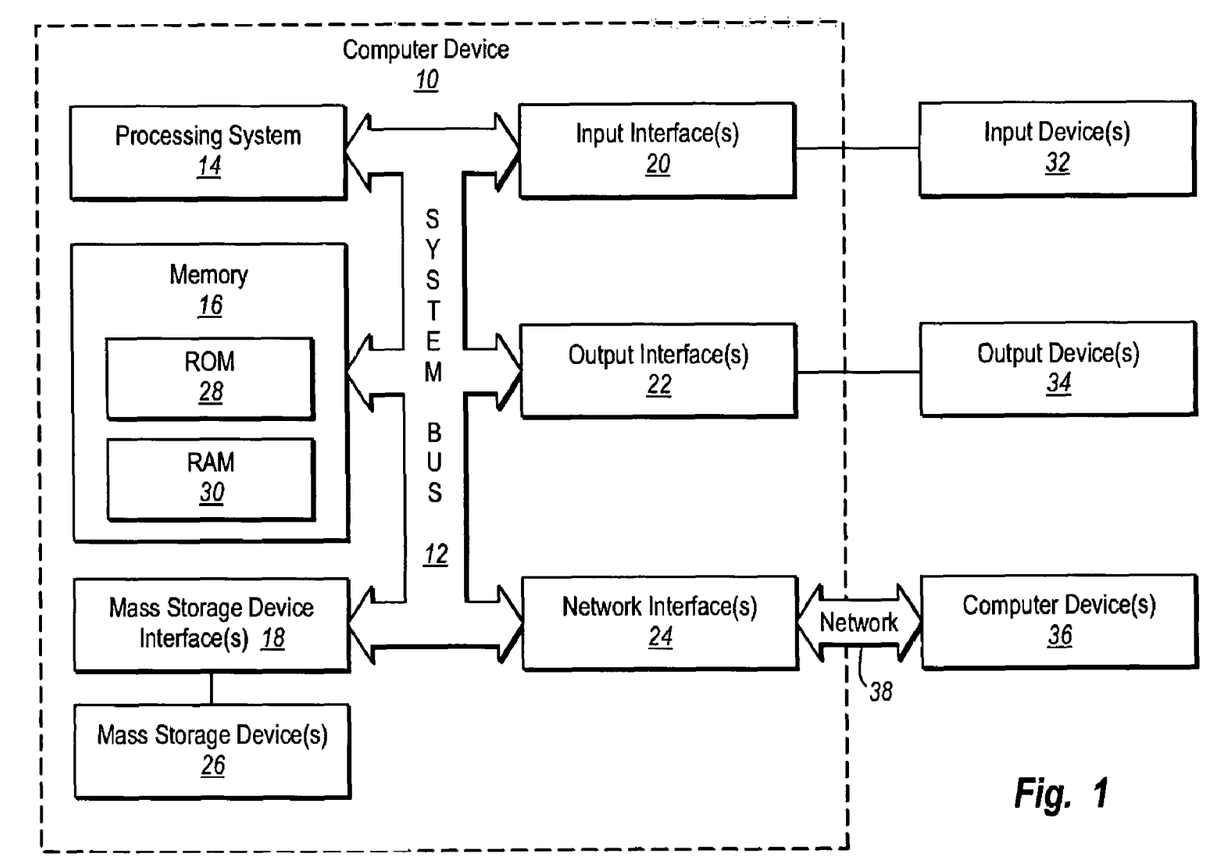
FIG. 1 illustrates a block diagram of a suitable computer operating environment for embodiments of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration. Alternatively, the invention may also be practiced in whole or in part manually following the same procedures.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA"), smart phone, or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer-readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a Firewire™ (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Modular Computer System

Figure 2:
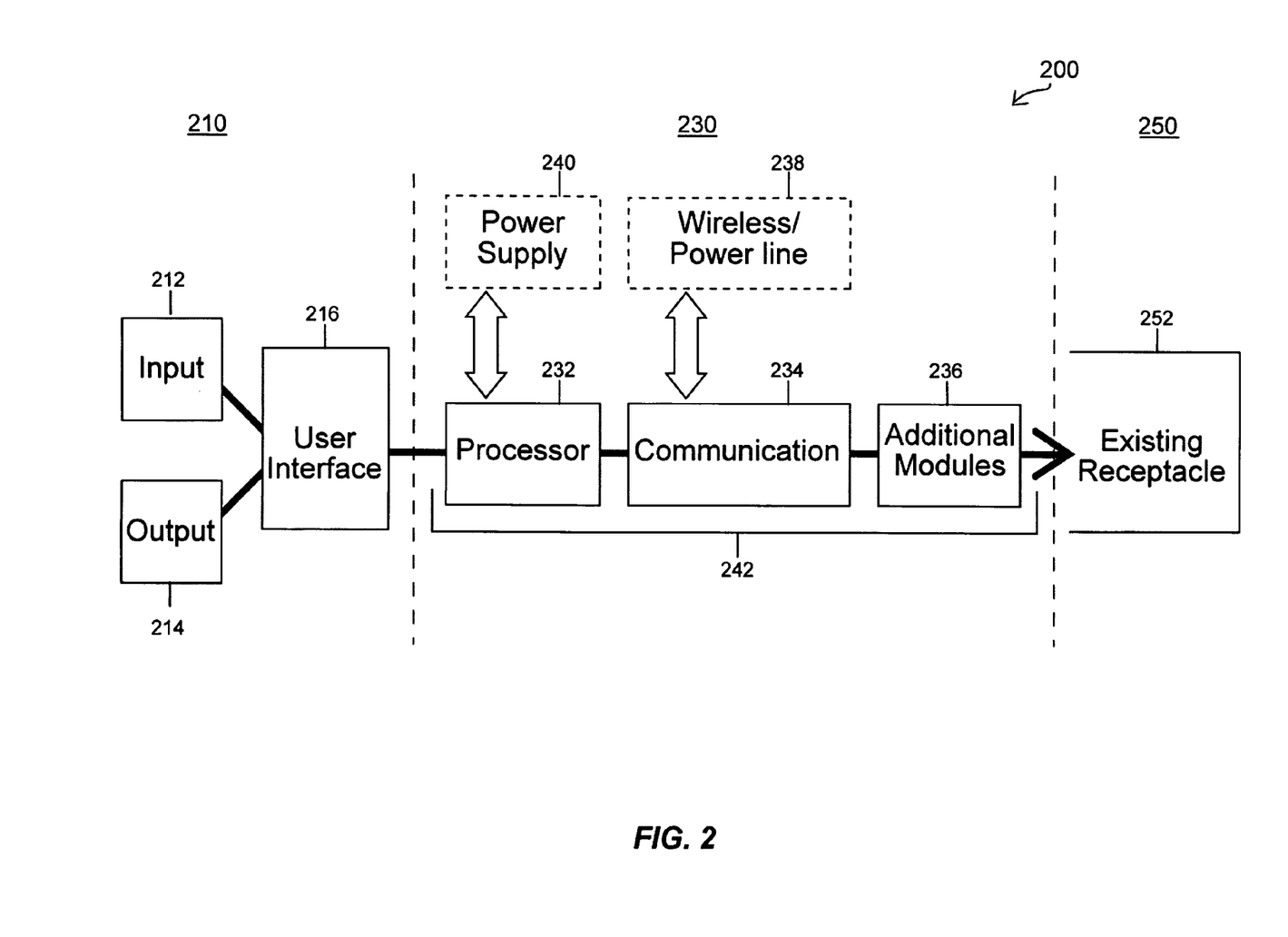
FIG. 2 illustrates a functional block diagram of one embodiment of a modular computer system electrically and mechanically coupled to an existing receptacle.

Reference is next made to FIG. 2, which illustrates a functional block diagram of one embodiment of a modular computer system electrically and mechanically coupled to an existing receptacle, designated generally at 200. The system includes an external interface portion 210, an extendable computer system 230, and an existing receptacle 250. The existing receptacle 250 includes an existing receptacle module 252, which further includes an electrical line and housing. The electrical line is an electrically related wire coupled to a power system that may extend throughout the entirety of the receptacle region. For example, in a U.S. residential environment, an electrical line includes a 120V 60 Hz AC grounded power line from a fuse box. The housing is a partially enclosed, mechanically supported internal region within a wall/vertical structure in which an opening on the wall extends into the internal region. The housing may be a conventional NEMA standard OS1 or OS2 type electrical box. Residential and commercial building are often equipped with numerous receptacles to facilitate a variety of electrical functionalities, including but not limited to switches, dimmers, timers, sensors, thermostats, intercoms, etc. The electrical line extends through the wall/vertical structure and into the internal region of the housing. Some input devices enable a user to effectuate adjustment without physically contacting the modular computer system. Such a switching mechanism is disclosed in U.S. Pat. No. 7,115,856 (2006) to Peng, et al., the disclosure of which is incorporated herein in its entirety.

The extendable computer system 230 is expandably coupled to the existing receptacle module 252. The extendable computer system 230 includes an expansion bus/slide tray 242, a processor module 232, a power supply 240, a communication module 234, a communication medium 238, and a set of additional modules 236. The slide tray is mechanically coupled to the housing to both support the extendable computer system 230 and facilitate expansion into and out of the internal region of the housing. The slide tray 242 also facilitates data coupling of the various modules to one another (data inter-coupling) and electrically coupling of the extendable computer system 230 to the electrical line within the housing of the existing receptacle 250. The data coupling and/or electrical coupling between the modules may utilize conventional electrical wire traces, inductive EM coupling, etc. The processor module 232 is a computer processor such as a motherboard configured to be housed on the slide tray 242. The power supply 240 provides electrical power to the extendable computer system. The power supply 240 is electrically coupled to the electrical line of the existing receptacle module 252. Alternatively, the power supply 240 may utilize an on-board battery type power supply.

The communication module 234 is configured to dynamically communicate with other modular computer systems via a communication medium 238. The communication medium 238 may modulate an alternating current in the electrical line or utilize some form of wireless networking protocol. The communication module 234 and communication medium 238 include dynamic system resource identification and utilization. For example, the communication module 234 is configured to identify and utilize a motion sensor coupled to a second modular computer system within the same region or structure. Various well known technologies exist for this dynamic identification, including but not limited to Bluetooth proximity detection, Ultra Wide Band (UWB) protocols, Zig-Bee, HomePlug, etc. The system may also communicate with other systems, such as a notebook or personal computer, a wireless network interface, a personal digital assistant ("PDA"), smart phone, or other hand-held device. The additional modules 236 represent the dynamic ability of the extendable computer system 230 to receive additional resources such as additional communication systems, sensors, security systems, climate control systems, etc. The extendable computer system 230 is configured to automatically detect and integrate the resources available on additional modules coupled to the system.

The external interface portion 210 includes a user interface 216, an input module 212, and an output module 214. The external interface portion 210 is mechanically coupled to the slide tray 242 and positioned to remain external when the extendable computer system 230 is positioned within the internal region of the housing. The external interface 210 is data coupled to the processor module 232 so as to allow interactive communication between a user (not shown) and the system 200. The input and output modules 212, 214 may be combined or separated depending on the particular interface. For example, a physical toggle switch is a type of user input device which also conveys an output based on its physical orientation. Whereas, a keypad is a user interface device that conveys no output and may therefore be coupled with an output device such as a display monitor. Other input modules include, and are not limited to, thermostats, dimmer switches, timer switches, slide switches, intercoms, motion detectors, and sound detectors.

Figure 3:
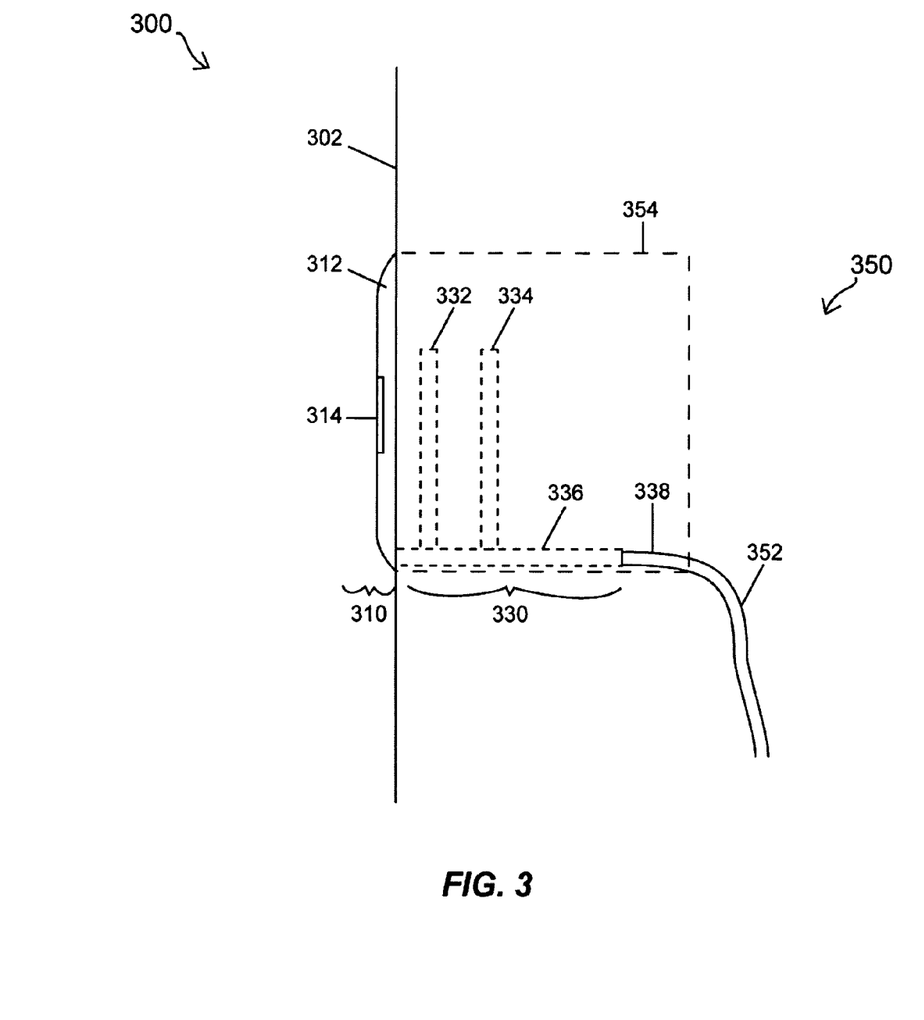
FIG. 3 illustrates a profile view of the system illustrated in FIG. 2 in a collapsed state.

Reference is next made to FIG. 3, which illustrates a profile view of the system illustrated in FIG. 2 in a collapsed state, designated generally at 300. The system 300 includes the external interface 310, extendable computer system 330, and existing receptacle 350. The external interface 310 is disposed on an outer surface of a wall 302. Portions of the external interface may be disposed within the housing and remain consistent with the present invention. The extendable computer system 330 is illustrated as being disposed completely within the housing of the existing receptacle 350. The illustrated external interface 310 includes a cover 312 that externally conceals the extendable computer and existing receptacle. The cover 312 is shaped to be two dimensionally larger than the opening of the housing. The external interface 310 further includes a user input and output module 314. The illustrated input and output module 314 is a touch-less switching mechanism that includes a sensory indication as to its electrical state, such as described in U.S. Pat. No. 7,115,856. The extendable computer system 330 includes a processor 332, a communication module 334, slide tray 336, and an electrical coupling 338 to the electrical line 352 of the existing receptacle 350. The illustrated processor 332 and communication module 334 are vertical card modules that are mechanically releasably coupled to the slide tray 336. The external interface 310, processor 332, and communication module 334, are also data coupled to one another as described above. It should also be noted that the cover 312 may be a simple decorative cover, with no interface per se but merely to conceal the computer system. In such cases, user interface is accomplished through other connected computer systems or through an interface module disposed on the slide tray 336 like the other modules.

Figure 4:
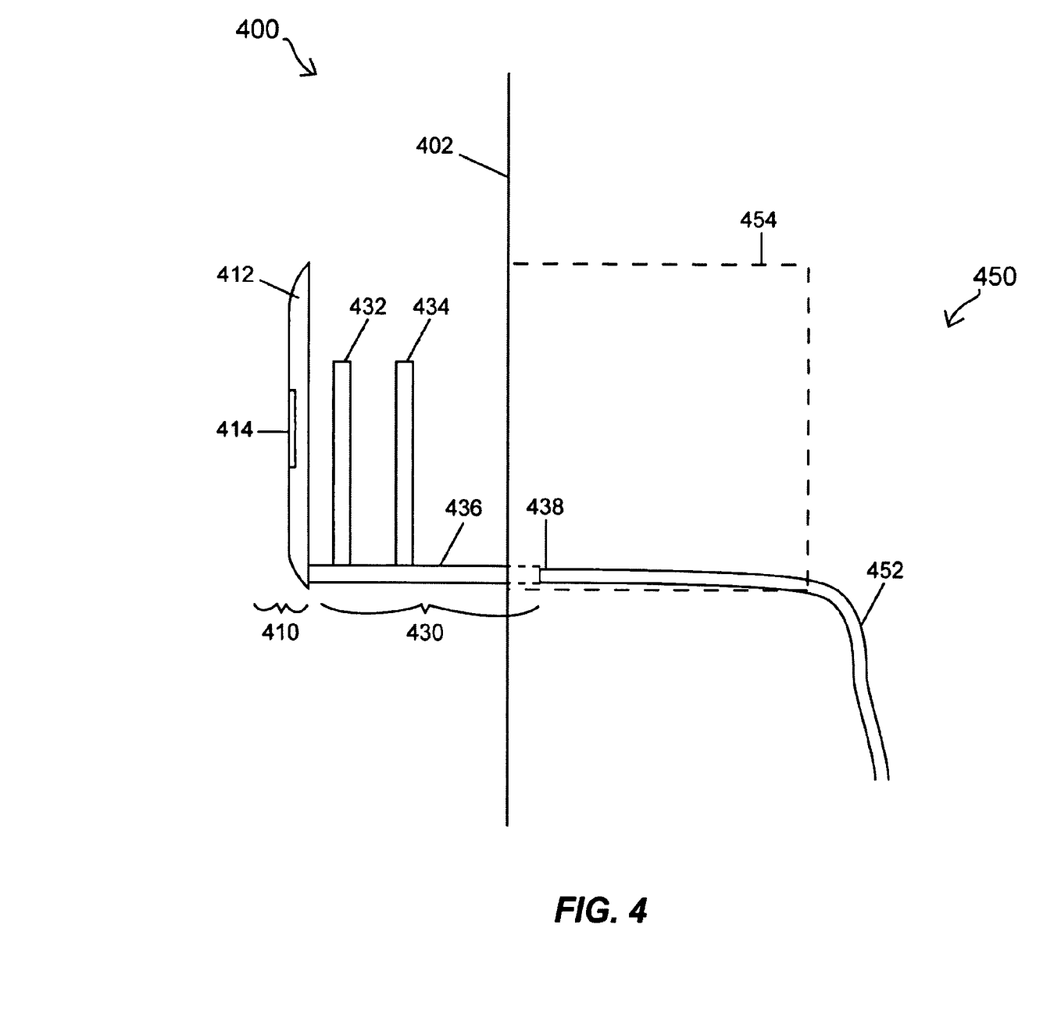
FIG. 4 illustrates a profile view of the system illustrated in FIG. 2 in an extended state.

Reference is next made to FIG. 4, which illustrates a profile view of the system illustrated in FIG. 2 in an extended state, designated generally at 400. The system 400 includes the external interface 410, extendable computer system 430, and existing receptacle 450. The external interface 410 is disposed on an outer surface of the slide tray 436 and extended away from the wall 402. The extendable computer system 430 is illustrated as being extended away from the wall 402 and housing of the existing receptacle 450. The slide tray 436 may utilize well known mechanisms to facilitate the extendable coupling and mechanical support of the extendable computer system 430 relative to the existing receptacle 450. For example, conventional lateral and/or lower drawer brackets, compliant springs, hydraulics, etc. The external interface 410 may be configured to lock into the receptacle 450 in an effort to child-proof the design and prevent unintentional opening of the system.

Figure 5:
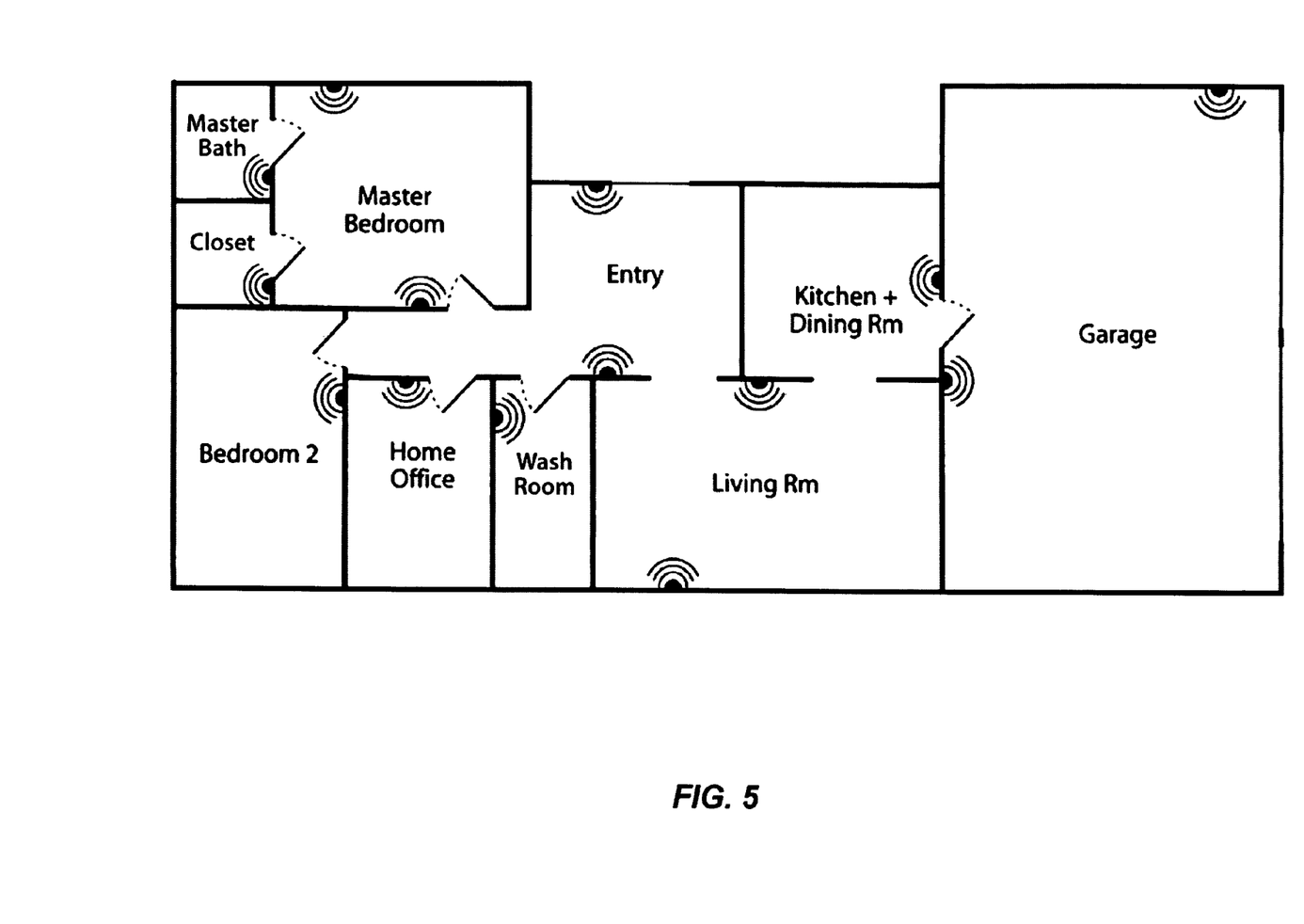
FIG. 5 illustrates a residential networking schematic of a plurality of modular computer systems.

Reference is next made to FIG. 5, which illustrates a residential networking schematic of a plurality of modular computer systems. The schematic illustrates a plurality of modular computer systems data coupled to one another in a manner to share resources and perform network-based functions. Although illustrated in a residential environment, teachings of the present invention are also applicable to various educational, commercial, medical, and industrial environments.

Figure 6:
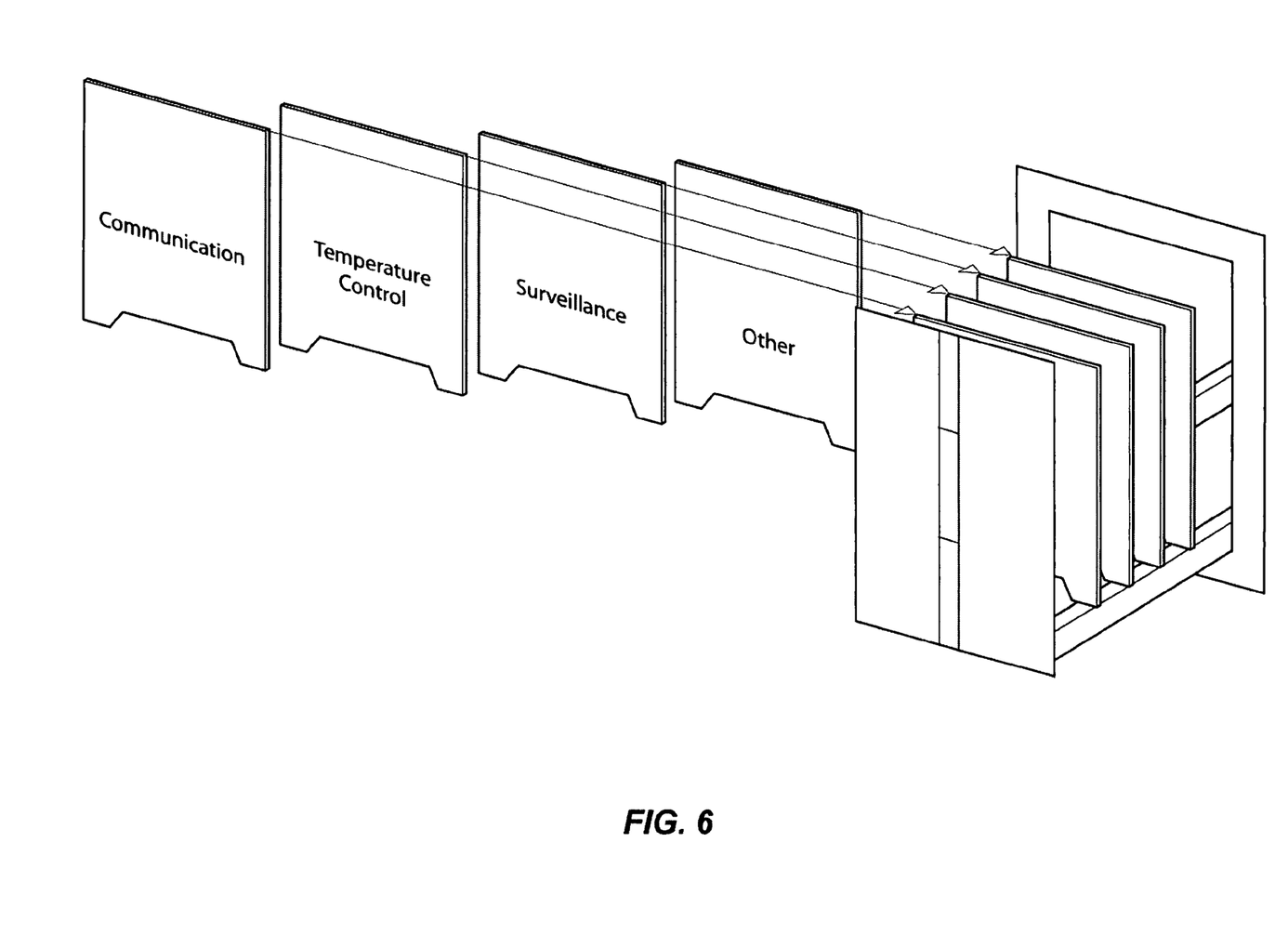
FIG. 6 illustrates a conceptual design of a modular computer system extending from an existing receptacle in accordance with embodiments of the present invention.

Reference is next made to FIG. 6, which illustrates a conceptual design of a modular computer system extending from an existing receptacle in accordance with embodiments of the present invention. The illustrated modules left of the slide out external interface represent functionalities that may be controlled via the external interface of one or more data-coupled modular computer systems. In addition, the figure illustrates the extendable slide tray configuration described above in which modules of the computer system are vertical card like members that are capable of being concealed from view by the external interface and the housing of the existing receptacle. In the illustrated embodiment, the external interface is two-dimensionally shaped to correspond with the shape of the housing opening.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. An internal modular computing system comprising:
an existing outlet receptacle disposed on a wall of an interior region, wherein the existing outlet receptacle includes an electrical line and a housing;

a computer system disposed substantially within the housing and electrically coupled to the electrical line, wherein the electrical line is the power source for the computer system, and further including:
- a mechanically extendable expansion bus configured to mechanically support and dynamically data intercouple a set of modular modules, wherein the mechanically extendable expansion bus includes an extended state and a collapsed state;
- a cover, externally visually obscuring the mechanically extendable expansion bus; and
- at least one computer module coupled to the mechanically extendable expansion bus;
- wherein the computer system resides within the outlet receptacle housing, concealed by the cover, when the expansion bus is in the collapsed state and is external the outlet receptacle housing when the expansion bus is in the extended state.

2. The system of claim 1, the cover being an interface module disposed on an outside surface of the computer system and coupled to the mechanically extendable expansion bus, wherein the human interface module includes both an input and output module.

3. The system of claim 2, the system further comprising a communication module coupled to the mechanically extendable expansion bus and configured to transmit and receive data with at least one other internal modular computing system; and wherein the communication module includes a dynamic polling function that automatically detects and data couples with other modular computing systems within the same interior region.

4. The system of claim 3, wherein the computer system further includes a processor module coupled to the mechanically extendable expansion bus.

5. The system of claim 3, wherein the communication module transmits and receives data with at least one other modular computer system through a wireless networking protocol.

6. The system of claim 3, wherein the communication module transmits and receives data with at least one other computer system through a wireless networking protocol.

7. The system of claim 6, the other computer system being selected from the set of computer systems consisting of: a notebook computer, a personal computer, a wireless network interface, a personal digital assistant ("PDA"), and a smart phone.

8. The system of claim 3, wherein the communication module transmits and receives data with at least one other modular computer system via the electrical line.

9. The system of claim 2, wherein the input module of the interface module is a touch-less interface that enables a user to effectuate adjustment without physically contacting the modular computer system.

10. The system of claim 2, the input module being selected from the set of input modules consisting of: toggle switches, dimmer switches, slide switches, timer switches, thermostats, intercoms, keypads, motion detectors, and sound detectors.

11. The system of claim 1, wherein the electrical line is a power line.

12. The system of claim 1, wherein the housing is a NEMA OS1 or OS2 electrical box.

* * * * *